(12) United States Patent
Bäckmark et al.

(10) Patent No.: US 11,533,897 B2
(45) Date of Patent: Dec. 27, 2022

(54) BED BUG TRAP

(71) Applicant: Nattaro Labs AB, Lund (SE)

(72) Inventors: Magnus Bäckmark, Södra Sandby (SE); Jette Knudsen, Höör (SE)

(73) Assignee: NATTARO LABS AB, Lund (SE)

( * ) Notice: Subject to any disclaimer, the term of this patent is extended or adjusted under 35 U.S.C. 154(b) by 0 days.

(21) Appl. No.: 16/649,930

(22) PCT Filed: Nov. 7, 2018

(86) PCT No.: PCT/EP2018/080509
§ 371 (c)(1),
(2) Date: Mar. 23, 2020

(87) PCT Pub. No.: WO2019/092043
PCT Pub. Date: May 16, 2019

(65) Prior Publication Data
US 2020/0296950 A1    Sep. 24, 2020

(30) Foreign Application Priority Data

Nov. 10, 2017   (EP) .................................... 17200992

(51) Int. Cl.
*A01M 1/14*     (2006.01)
*A01M 1/10*     (2006.01)

(52) U.S. Cl.
CPC .............. *A01M 1/14* (2013.01); *A01M 1/103* (2013.01); *A01M 2200/011* (2013.01)

(58) Field of Classification Search
CPC .. A01M 1/14; A01M 1/103; A01M 2200/011; A01M 1/18; A01M 1/145; A01M 1/10
See application file for complete search history.

(56) References Cited

U.S. PATENT DOCUMENTS

| 552,792 | A | * | 1/1896 | Stolz | ........................ | A01M 1/14 |
|---|---|---|---|---|---|---|
| | | | | | | 43/114 |
| 675,338 | A | * | 5/1901 | Hobbs | ..................... | A01M 1/14 |
| | | | | | | 43/114 |

(Continued)

FOREIGN PATENT DOCUMENTS

| GB | 1507696 A | * | 4/1978 | .............. A01M 1/02 |
|---|---|---|---|---|
| KR | 20160140315 A | * | 12/2016 | .............. A01M 1/06 |

(Continued)

*Primary Examiner* — Kathleen I Alker
*Assistant Examiner* — Carly W. Lynch
(74) *Attorney, Agent, or Firm* — James S. Keddie; Bozicevic, Field & Francis LLP (57) ABSTRACT

The present invention relates to a trap (10) for bed bugs (2) comprising an inner element (20) having an outer surface (24) delimited by a first base (22) and a first top (26), and an outer element (80) being hollow and having a second base (86) and a second top (88) delimiting an inner surface (84). The outer element is positioned around the inner element with the second top adjacent the first top and the second base adjacent the first base, whereby a tapering space (12), tapering towards the first top, is defined between the outer surface of the inner element and the inner surface of the outer element. The tapering space is accessible to bed bugs crawling on the outer surface of the inner element through a base opening defined between the outer surface of the inner element and the second base. An adhesive (6) is provided on at least part of the inner surface of the outer element for adhering to the dorsal side (4) of a bed bug crawling on the outer surface of the inner element. The invention further relates to a method of detecting and/or trapping bed bugs.

17 Claims, 6 Drawing Sheets

(56) References Cited

U.S. PATENT DOCUMENTS

| | | | |
|---|---|---|---|
| 1,194,736 A * | 8/1916 | Holden | A01M 1/14 |
| | | | 43/114 |
| 5,231,792 A | 8/1993 | Warner | |
| 8,316,578 B2 * | 11/2012 | Faham | A01M 1/14 |
| | | | 43/107 |
| 2009/0183419 A1 | 7/2009 | Harris | |
| 2011/0289822 A1 * | 12/2011 | Duehl | A01M 1/04 |
| | | | 43/113 |
| 2012/0285076 A1 | 11/2012 | Banfield | |
| 2016/0309694 A1 | 10/2016 | Azuela | |
| 2017/0006849 A1 * | 1/2017 | Frutos | A01M 1/10 |

FOREIGN PATENT DOCUMENTS

| | | | |
|---|---|---|---|
| WO | WO-2004098279 A2 * | 11/2004 | A01M 1/02 |
| WO | WO 2013/115719 A1 | 8/2013 | |
| WO | WO 2015/116801 A2 | 8/2015 | |

\* cited by examiner

BED BUG TRAP

CROSS-REFERENCE TO RELATED APPLICATIONS

This application is a § 371 national phase of International Application No. PCT/EP2018/080509, filed on Nov. 7, 2018, which claims the benefit of European Patent Application No. 17200992.0, filed on Nov. 10, 2017, which applications are incorporated by reference herein.

FIELD OF THE INVENTION

The present invention relates to the field of traps for bed bugs. In particular the present invention relates to a bed bug trap in which bed bugs are caught on the dorsal side of the insect and immobilized, by means of an adhesive provided on the inner surface of an outer element, while crawling on the outer surface of an inner element in an upwardly tapering space defined between an outer surface of the inner element and an inner surface of the outer element. The present invention further relates to a method of detecting and/or trapping bed bugs.

BACKGROUND OF THE INVENTION

Insect infestation of human habitats has been on the increase in recent years. One reason for this increase is the development of resistant insect species (although this differs from region to region) to prevalent extermination methods. By way of example, the population of bed bugs, having been almost eradicated in the developed world in the 1940s, has slowly been recovering since then. Moreover, the recovery has accelerated since mid-1990s.

Bed bugs (*Cimex lectularius, Cimex hemipterus*) are wingless insects with exoskeleton, the size and shape of an apple seed. They favor tight and dark spaces. Consequently, they prefer to hide in beds and crevices and cracks in floor/walls and behind skirting-boards. They feed on blood, are active at night and bite any areas of exposed skin. A number of adverse health effects may occur due to bed bug bites, including skin rashes, allergic reactions and/or mental distress. Obviously, above-mentioned rise in population has contributed to increase in bed bug bites and related conditions.

Several methods of combatting insect infestation in general, and that of bed bugs in particular, are known in the art.

One way to address said problem is to subject, for a determined period of time, the infested area to a temperature, either high or low, that is injurious to bed bugs. Accordingly, to kill adult bed bugs as well as laid eggs, said area needs to be heated to 60° C. for one hour or be kept below −18° C. for at least 48 hours.

Another frequently used method for combatting bed bugs is to spread diatomaceous earth (DE) in powder form on the floor and/or along or behind skirting-boards of the room. Once the bed bug comes into contact with DE, sharp micrometer-sized pieces of DE absorb the wax layer on the bed bugs. This starts an irreversible dehydrating process in the bed bug eventually leading to its death. This method may also be used in combatting other insects having similar properties and behavioral patterns.

Still other methods propose the use of different kinds of traps designed to trap bed bugs. These traps typically are of the pit-fall type where bed bugs fall of a precipice into a container in which they are collected, one example being shown by US20090183419A1 wherein a bed bug trap comprises a cone having a top opening through which the bed bugs fall, the inner surface of the cone being covered by an adhesive. Another example is shown in U.S. Pat. No. 5,231,792 wherein an insect trap comprises dual cones stacked on top of each other to define a passageway into the inner cone in which a bait or lure is placed and into which an insect is lured and trapped.

Despite these advancements there is still a need for further traps for trapping and detecting bed bugs.

Accordingly, it is an object of the present invention to provide a trap for bed bugs which is simple and of low cost so that it may be used in high numbers to more securely detect the presence of, and/or trap, bed bugs.

It is a further object of the present invention to provide a trap for bed bugs which decreases the risk that the bed bugs detect and grow wary of the trap.

It is yet a further object of the present invention to provide a trap for bed bugs which allows the capture of bed bugs to be easily detected.

It is still a further object of the present invention to provide a trap for bed bugs which can be supplied in a knock-down, unassembled or unfolded shape to be assembled by a user.

It is still a further object of the present invention to provide a trap for bed bugs which when used together with a lure is effective for a long time.

It is still a further object of the present invention to provide a method of detecting and/or trapping bed bugs.

SUMMARY OF THE INVENTION

At least one of the above objects, or at least one of the objects which will be evident from the below description, is according to a first aspect of the invention achieved by a trap for bed bugs comprising:
- an inner element having an outer surface delimited by a first base and a first top, and
- an outer element being hollow and having a second base and a second top delimiting an inner surface,
- the outer element being positioned around the inner element with the second top adjacent to the first top and the second base adjacent to the first base, a tapering space being defined between the outer surface of the inner element and the inner surface of the outer element, the tapering space tapering towards the first top,
- the tapering space being accessible to bed bugs crawling on the outer surface of the inner element through a base opening defined between the outer surface of the inner element and the second base, wherein an adhesive is provided on at least part of, preferably all of, the inner surface of the outer element for adhering to the dorsal side of a bed bug crawling on the outer surface of the inner element.

Thus the present invention provides a very simple trap, as offered by the use of merely one inner and one outer element, which is still effective in trapping bed bugs due to the bed bugs never encountering the adhesive until it is too late and the adhesive has already contacted the dorsal side of the bed bugs, e.g. the back shield or the back side or dorsal side of the abdomen of the bed bug. The trap can be made from a low amount of material, for example by merely folding or bending two planar sheets of inexpensive materials such as paper. Simply inverting the trap and visually inspecting the tapering space allows any trapped bed bug to be readily identified. The trap may further be conveniently handled, by gripping the outer element, without necessitating contact with the adhesive or any bed bugs caught in the adhesive.

The simple construction further allows the trap to be supplied in a space saving disassembled state where for example the inner and outer elements are separate, to be assembled by the user of the trap.

While the trap according to the first aspect of the present invention is primarily aimed at trapping bed bugs, also other crawling insects will become trapped on their dorsal sides provided that they crawl far enough into the tapering space towards the first top.

The inner element may be solid or hollow. It may for example be made from bent or folded paper or cardboards, moulded pulp, moulded plastic, or any other material that can be suitable shaped and provided or having an outer surface that the bed bugs can crawl on.

The outer surface preferably has a surface roughness that is suitable for bed bugs to crawl on. Ordinary paper and cardboard have at least the required surface roughness.

In the context of the present invention delimited is to be understood as encompassing that the feature referred to is provided between, or bordered by, the delimiting features. The first base is preferably of wider cross section than the first top. The first base may be suitable for placing and supporting the trap on a planar surface. In any case the inner element, preferably via the first base, may be used to support the trap. The first base may be closed or open, i.e. establishing fluid communication into the interior of the inner element. The first base may have a circular or polygonal cross section.

The first top is positioned opposite, such as distally from, the first base. The first top may be pointed or blunt, such as where the inner element has a frustoconical shape or is shaped as a truncated pyramid. The first top may be provided with a radial, i.e. perpendicular to the general longitudinal axis of the inner element extending from the first base to the first top, through going bore for receiving a retaining pin or rod to lock the outer element in position around the inner element. The first top may also be provided with a handle in the shape of a string or rod attached to the first top to facilitate handling of the inner element and/or the trap.

The outer element is hollow and may for example be made from bent or folded paper or cardboards, moulded pulp, moulded plastic, or any other material that can be suitable shaped. Hollow is to be understood as encompassing that at least a part of the element referred to is hollow, whereas another part of the element may be solid. For example a lower part of the outer element may be hollow, whereas an upper part, which extends beyond the first top of the inner element, may be solid.

The second base is preferably of wider cross section than the second top. The second base may be defined by the circumference of the outer element. The second base should be open, i.e. establishing fluid communication into the interior of the outer element. The second base may have a circular or polygonal cross section.

The second top is positioned opposite, such as distally from, the second base. The second top may be pointed or blunt, such as where the outer element has a frustoconical shape or is shaped as a truncated pyramid. The second top may be provided with a radial through going bore for receiving a retaining pin or rod to lock the outer element in position around the inner element. The outer element at the second top may also be provided with a handle, for example being formed by partly cutting off the second top and folding the cut off part to the side.

The inner surface preferably has a surface that allows the adhesive to be attached to it.

The outer element is positioned around the inner element. The outer element may be positioned so that all of the outer element is provided around the inner element, or alternatively only a part of the outer element is provided around the inner element as long as the tapering space is formed between the inner and outer surfaces. Preferably the outer surface of the inner element is not fully covered by the outer element, instead a part of the outer surface adjacent the first base should be non-covered, i.e. the outer element should not be provided around this part of the inner element, in order that bed bugs crawling on a planar surface on which the first base is positioned on should first encounter the outer surface of the inner element. Typically this part of the outer surface may be spaced apart from the first base 0.5-10 mm, such as 2-5 mm, such as 3-4 mm towards the first top. A low value, i.e. 0.5 mm-1 mm, may be selected to only allow nymphs to access the tapering space in case only the capture of nymphs is of interest.

Alternatively however it is contemplated that the outer element could cover also this part, i.e. the second base being aligned with the first base. In this case bed bugs must enter the trap directly through the base opening, or alternatively one or more apertures or cut-outs may be provided in the outer element along the second base thereof to provide entry into the tapering space.

In the context of the present invention the second top should be adjacent to the first top. This is not to be understood as requiring an alignment of the second top and the first top along the longitudinal axis of the inner and outer elements, rather adjacent is here to be understood as encompassing any of close to, in the vicinity of, and near, and generally the second top should be closer to the first top than to the first base, and the second base should be closer to the first base than to the first top.

The tapering space may generally be annular or polygonal, or in other words provided around the circumference of the inner element, e.g. defined between the outer circumference of the inner element and the inner circumference of the outer element. The tapering of the tapering space is to be understood to encompass that the distance between the outer circumference of the inner element and the inner circumference of the outer element decreases towards the first top. Thus the tapering may, but does not require, that the width or diameter of the tapering space also decreases, as long as the radial cross sectional area of the tapering space decreases. The tapering space preferably ends at or near the first top, i.e. here the outer surface of the inner element and the inner surface of the outer element contact each other so that the distance between them is zero. Alternatively the tapering space may end at a position in which the minimum distance between the inner and outer surfaces is still non-zero provided that this minimum distance is smaller than the height of a bed bug to ensure that the adhesive of the inner surface will contact the bed bug.

The tapering space is accessible, i.e. such that a bed bug may enter it, through the base opening, this base opening being defined between the outer surface of the inner element and the second base, i.e. between the outer circumference of the inner element and the inner circumference of the outer element at the second base. The base opening may thus be annular or shaped as an annulus.

The adhesive may be provided as a sticky liquid or gel-like substance directly to the inner surface, or may alternatively be provided on a separate carrier, such as for example as a double sided adhesive tape, to the inner surface.

If the adhesive is provided on a part of the inner surface it is preferably provided on those parts of the inner surface where the distance to the outer surface is smaller than 3 times, such as smaller than 2 times, the height of a bed bug. The adhesive need for example not be provided where the distance is less than 0.5 times the height of a bed bug.

The adhesive should be capable of adhering to the dorsal side of a bed bug. In the context of the present invention it is to be understood that such an adhesive is also capable and/or suitable for adhering to any upper body portion of a bed bug.

In a preferred embodiment of the trap according to the first aspect of the present invention the inner element is hollow and comprises a lure compartment therein, and a hole for establishing fluid communication between the lure compartment and the tapering space is provided in the outer surface.

This is advantageous in that a lure increases the tendency of bed bugs to enter the trap. The hole is preferably provided near the first top and in a position where the distance between the outer surface and the inner surface is less than the height of a bed bug so that a bed bug cannot reach the lure without contacting the adhesive, e.g. with its dorsal side.

The lure compartment may be open to the exterior of the trap via the first base.

The lure may comprise at least (E)-2-hexenal, (E)-2-octenal and 2-hexanone. The lure may additionally comprise (E)-2-hexenoic acid and 2-octenoic acid.

Preferably the lure comprises 1 part (E)-2-hexenal, (1) to 5 parts (E)-2-hexenoic acid, 1 part (E)-2-octenal, 1 to 10 parts 2-octenoic acid and 1 part 2-hexanone. All parts may be by weight. Alternatively the lure comprises 100-300 mg/l (E)-2-hexenal, 100-1500 mg/l (E)-2-hexenoic acid, 100-300 mg/l (E)-2-octenal, 100-3000 mg/l 2-octenoic acid, and 100-300 mg/l 2-hexanone, based on the total volume of the lure. A dose of the lure may comprise 0.1 to 100 g, such as 0.5 to 10 g, such as 0.5 to 3.5 g of the lure, or alternatively, 0.1 to 100 ml, such as 0.5 to 10 ml, such as 0.5 to 3.5 ml of the lure.

Preferably the lure comprises no other volatile components than (E)-2-hexenal, (E)-2-hexenoic acid, (E)-2-octenal, 2-octenoic acid and 2-hexanone.

In a preferred embodiment of the trap according to the first aspect of the present invention the inner element comprises a plurality of individual lure compartments, and the outer surface of the inner element comprises a plurality of holes for establishing fluid communication between a corresponding lure compartment and the tapering space.

Each lure compartment is preferably only open to the exterior of the trap (including the tapering space) via its corresponding hole.

This is advantageous in that the different lures, customized for efficiently attracting different sub-populations, such as males, females, different nymph instars, or different species of bed bugs, i.e. *Cimex lectularius* and *Cimex hemipterus*, can be used concurrently in the trap.

In a preferred embodiment of the trap according to the first aspect of the present invention at least one hole is covered by a puncturable seal or a tearable cover.

This is advantageous as it allows the trap to be stored over time without the lure losing its effectiveness. When the trap is to be used the seal or cover is punctured or torn, and the corresponding lure is allowed to release its scent into the tapering space. Alternatively, where different lures are provided in different lure compartments, the user of the trap may select to activate a single lure by puncturing or tearing only that seal or cover.

In a preferred embodiment of the trap according to the first aspect of the present invention the inner element is made from paper or plastic.

Paper and plastic are good materials for the inner element. Plastic may be preferred if the inner element includes a plurality of lure compartments, or if the inner element is to be used several times, whereas paper provides the cheapest and most environment friendly inner element. Other suitable materials include cardboard. The paper or cardboard may have density of more than 70 $g/m^2$, such as more than 200 $g/m^2$ or 80-300 $g/m^2$, such as 80-200 $g/m^2$, or 100 to 150 $g/m^2$.

Further suitable materials include moulded pulp and pressed leaves.

In an alternative embodiment of the trap according to the first aspect of the present invention the inner element is made out of a lure material as described above.

This is advantageous in that it provides a very simple inner element. The lure material may for example include a vax, gelatine or a polyethylene glycol (PEG) that retains its shape at room temperature. Alternatively the lure material may comprise mineral oil.

In a preferred embodiment of the trap according to the first aspect of the present invention at least one groove or ridge, extending at least partly from the first base towards the first top, is provided in or on the outer surface of the inner element.

This is advantageous because bed bugs by instinct tend to follow structures, such as grooves or ridges, extending upwards thus rendering the trap more interesting for the bed bugs. Preferably a plurality of circumferentially spaced grooves or ridges are provided on the outer surface of the inner element. The depth or height of the grooves or ridges should either be less than the height of a bed bug, or decreasing towards the first top, to ensure that the bed bugs cannot escape contact with the adhesive on the inner surface by staying in the groove or near the ridge. Where a ridge is provided in or on the outer surface of the inner element the ridge may also serve as a spacing element to maintain the distance between the outer surface of the inner element and the inner surface of the outer element in order to define the tapering space.

In a preferred embodiment of the trap according to the first aspect of the present invention the inner surface of the outer element, and/or the outer surface of the inner element is provided with at least one spacing element for ensuring a minimum distance between the outer surface of the inner element and the inner surface of the outer element at the second base. This is advantageous in that it ensures that the tapering space is accessible to the bed bugs through the base opening. It also makes the trap more robust, especially when the trap is made from less sturdy materials such as paper, and thereby facilitates handling of the trap.

The spacing element should contact the opposite surface so as to prevent the inner and outer surface at the spacing element from coming closer than the distance that the spacing element protrudes from the inner or outer surface.

The spacing element may for example be formed by attaching a protrusion to the inner or outer surface, by forming a protrusion in the inner or outer surface, or by partially cutting the inner or outer surface to form a portion thereof that may be folded, bent or inverted so as to provide the spacing element.

In a preferred embodiment of the trap according to the first aspect of the present invention the outer element has a top opening at the second top, the top opening being configured for receiving the first top so that at least part of the first top extends through the top opening.

This is advantageous in that it allows the trap to be handled by manually gripping the first top. By the circumferential contact between first top and the outer element around the top opening a stabilising or stiffening effect is obtained on the outer element so as to maintain the shape of the outer element including maintaining the tapering space between the outer surface and the inner surface.

In a preferred embodiment of the trap according to the first aspect of the present invention the first base has a larger cross sectional area than the first top, and wherein the second base has a larger cross sectional area than the second top.

This is advantageous in that it provides a trap having a lower center of gravity thus making the trap more stable. This is especially desirable when making traps out of lightweight materials.

In some embodiments the trap has a height that is larger than the width of the first and second bases. The trap may for example have a height that is 1.1-3, such as 1.3-2 times the width of the first and second bases. Such traps have a small footprint, i.e. take up little space when placed on a surface. In other embodiments the trap has a height that is smaller than the width of the first and second bases. The trap may for example have a height that is 0.05-0.9, such as 0.05-0.5 or 0.1-0.5 times the width of the first and second bases. Such traps may resemble a disk and be useful in small spaces such as in beds or in or under furniture, under doorsteps or skirting boards, etc.

In a preferred embodiment of the trap according to the first aspect of the present invention the inner element has a conical, frustoconical, pyramidal or truncated pyramidal shape, and the outer element has a conical, frustoconical, pyramidal or truncated pyramidal shape.

This is advantageous as these shapes provide a large outer surface on which the bed bugs may crawl, and these shapes are also easy to manufacture. The cone angle or top angle for the inner element should be smaller than the cone angle or top angle for the outer element. The cone angle or top angle of the inner element may be 50% or lesser, such as 35% or lesser, such as 10% or lesser, such as 5% or lesser, such as 2% or lesser, than the cone angle or top angle of the outer element. Alternatively the cone angle or top angle of the inner element may be 20° or lesser, such as 10° or lesser, such as 5° or lesser, such as 2° or lesser than the cone angle or top angle of the outer element.

The cone angle or top angle for the outer element should be 180° or smaller, such as 175° or smaller, such as 120° or smaller, such as 90° or smaller, such as 60° or smaller, such as 45° or smaller.

In some embodiments the cone angle or top angle of the outer element may be 30-90° such as 40-75°, such as 45-65°, while the cone angle or top angle of the inner element is 0.1-10°, such as 0.1-5° or 0.1-2° smaller than the cone angle or top angle of the outer element.

Traps according to these embodiments provide a small footprint, i.e. take up little place in use while providing a large inner surface of the outer element yielding a high capacity for trapping bed bugs. Furthermore, less light enter the tapering spaces of these traps, thus they become attractive to the bed bugs.

In other embodiments the cone angle or top angle of the outer element may be 90-180° such as 100-180°, such as 120-175°, while the cone angle or top angle of the inner element is 0.1-10°, such as 0.1-5° or 0.1-2° smaller than the cone angle or top angle of the outer element.

Traps according to these embodiments have a low height, and may resemble discs, and can thus be positioned in small spaces such as in beds or in or under furniture, under doorsteps or skirting boards, etc.

In a preferred embodiment of the trap according to the first aspect of the present invention an area of the inner surface of the outer element adjacent the second top is devoid of adhesive. This is advantageous in that it is one way of making the outer element detachable from the inner element. The area may typically extend along the upmost (i.e. closest to the second top) ⅛ to ¼ of the outer element.

In a preferred embodiment of the trap according to the first aspect of the present invention the outer element is detachable from the inner element.

This is advantageous in that it allows for easy inspection of the trap, i.e. by removing and inverting the outer element such that the adhesive on the inner surface thereof may be inspected for any trapped bed bugs.

In a preferred embodiment of the trap according to the first aspect of the present invention at least one of the inner and outer elements is made from a folded or bent planar sheet, the planar sheet preferably being provided with indicia showing how it should be folded and/or a fastener for fastening one part of the planar sheet to another part of the planar sheet to maintain the planar sheet in a folded or bent configuration.

This is advantageous in that it allows the trap to be supplied and transported in an at least partially unassembled state. Preferably both of the inner and outer elements are made from a folded or bent sheet.

Preferably the sheet is cut into shape, such as a circular segment or a cut open and unfolded pyramidal shape.

The fastener typically comprises a strip of adhesive along one edge of the sheet for fastening that edge to another edge of the sheet once the sheet has been bent or folded into shape.

A stiffening element may be provided attached to the sheet at a position opposite the fastener when in the conical shape in order to even out the effect of the fastener on the shape of the element.

The inner and outer element may also be made from folded or bent planar sheets and then flattened prior to transportation and packaging. Such elements may be de-flattened prior to positioning the outer element on the inner element, or alternatively the outer and inner elements may be flattened when assembled.

For the outer element a release sheet may be used to protect the adhesive from adhering unintentionally when the outer element is present as a planar sheet, or when it is flattened.

At least one of the above objects, or at least one of the objects which will be evident from the below description, is according to a second aspect of the present invention achieved by a method of detecting and/or trapping bed bugs, comprising the steps of:

i. providing a trap according to any of the preceding claims, and ii. positioning the trap with the first base towards a planar surface in a locale where bed bugs are present or suspected of being present.

BRIEF DESCRIPTION OF THE DRAWINGS AND DETAILED DESCRIPTION

A more complete understanding of the above mentioned and other features and advantages of the present invention will be apparent from the following detailed description of preferred embodiments in conjunction with the appended drawings, wherein.

In the figures and the description the same reference numeral is used to refer to the same feature. One or more ' added to a reference numeral indicates that the feature so referenced has a similar function, structure or significance as the feature carrying the reference numeral without the ', however not being identical with this feature.

Further, a subscript numeral added to a reference numeral indicates that the feature so referenced is a further one of the feature carrying the reference numeral without the subscript numeral.

Figure 1A:
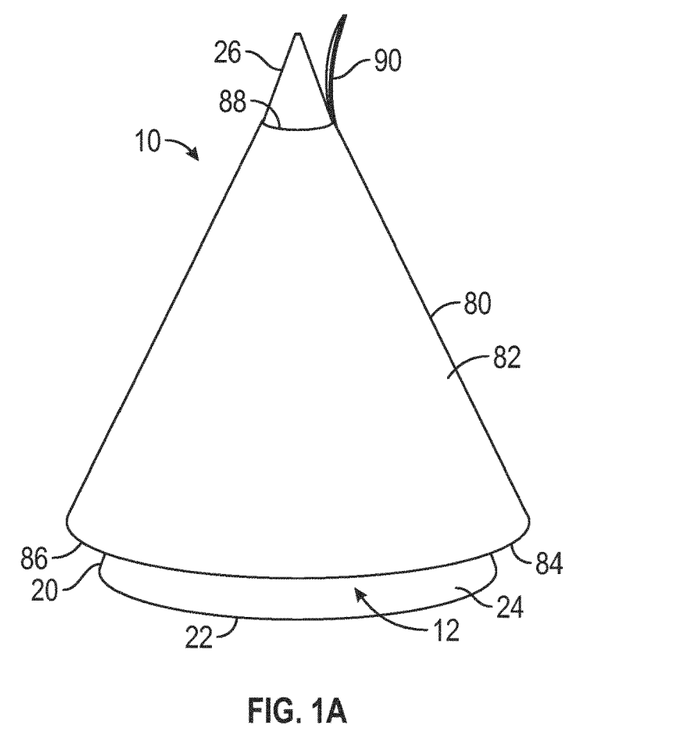
FIG. 1A is a perspective view of a first embodiment of the trap for bed bugs according to the first aspect of the present invention.

FIG. 1A is a perspective view of a first embodiment of the trap 10 for bed bugs according to the first aspect of the present invention. The trap 10 is characterized by a tapering annular space 12 defined between an inner element represented by inner cone 20, having a first base 22, an outer surface 24 and a first top 26, and an outer element represented by outer cone 80 having an outer surface 82, an inner surface 84, a second base 86 and a second top 88. A part of the outer cone 80 extends as a tab or carrying handle 90 for allowing the outer cone 80 to be positioned over and around the inner cone 20.

Figure 1B:
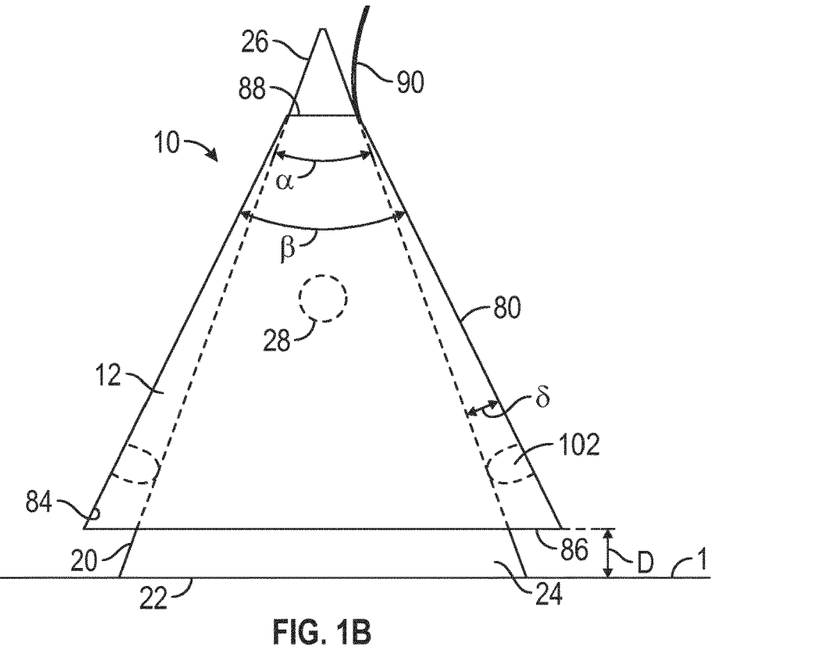
FIG. 1B is a cross sectional view of the trap shown in FIG. 1A.
Figure 1C:
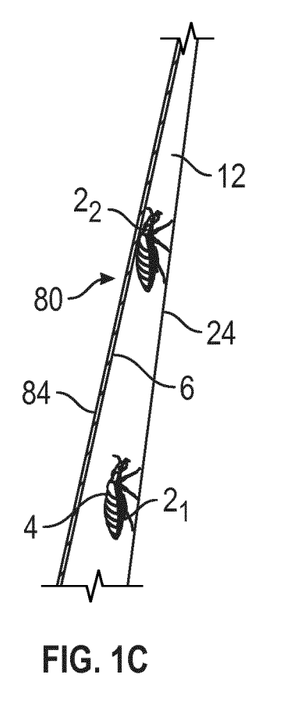
FIG. 1C is a magnified partial view of the trap shown in FIG. 1A showing the space between the outer and inner surfaces.

The inner space 12 is defined by the inner and outer cones 20 and 80 due to the differing cone angles $\alpha$ and $\beta$ of the respective inner and outer cones where $\beta > \alpha$ thus creating a distance $\delta$ between the outer surface 24 of the inner cone 20 and the inner surface 84 of the outer cone 80, as seen in FIG. 1B which is a cross sectional view of the trap shown in FIG. 1A. The distance $\delta$ will decrease along the inner cone 20 along the direction from the base 22 towards the first top 26. In use the trap 10 is placed or fastened with the base 22 of the inner cone 20 towards a flat (planar) surface 1. The base 86 of the outer cone is spaced apart from the base 22 of the inner cone 20, thus resulting in a distance D between the base 86 of the outer cone 80 and the flat surface 1, D preferably being larger than the distance a bed bug can reach. A base opening is defined at reference numeral 86 between the second base 86 and the outer surface 24. The base opening is shaped as an annulus, i.e. it is annular. As is evident from FIG. 1B and FIG. 1C which is a magnified partial view of the trap shown in FIG. 1A showing the space 12 between the outer and inner surfaces 24 and 84, a bed bug 2 crawling over the flat surface 1 encounter the outer surface 24 of the inner cone 20 and will, due to instinct and in some embodiments due to the scent escaping through the hole 28 from a lure placed inside the inner cone 20, explore the outer surface 24, and in particular be enticed by the relative low light conditions prevalent in the tapering space 12 to crawl over the outer surface 24 towards the first top 26. In order to capture or trap the bed bug an adhesive 6 is provided on the inner surface 84 of the outer cone 80 as seen in FIG. 1C. In the vicinity of the bases 22 and 86 of the inner and outer cones 20 and 80 the distance $\delta$ is preferably in the range of 0.5-10 mm, such as 1-10 mm or 2-10 mm allowing the bed bug 2 to easily crawl into the tapering space 12. Smaller $\delta$ can be used to ensure that only nymphs are able to enter the tapering space 12, while larger $\delta$ allow all different stages and sexes of bed bugs to enter the tapering space. However, as the bed bug 2 crawls towards the first top 26 the distance $\delta$ decreases until the adhesive 6 on the inner surface 84 contacts the dorsal side 4 of the bed bug 2. At this point the bed bug is caught and immobilized as illustrated by the bed bug $2_2$.

Advantageously, due to the distance D, bed bugs crawling on the flat surface 1 will encounter the outer surface 24 of the inner cone 20 before encountering the inner surface 84 of the outer cone 80, i.e. the bed bugs cannot begin their crawling on the trap 10 on the outer cone 80, such as on the outer surface 82 thereof. This decreases the risk that the bed bugs, which by instinct are cautious and therefore would become alarmed and retreat from the trap if their legs should encounter any adhesive 6, are caught fully on their dorsal sides 4 by the adhesive 6 without any advance warning.

Other alternatives are however possible where D is 0, and where a cutout, such as an inverted U-shaped incision is made in the outer element at the second base 86.

Figure 1D:
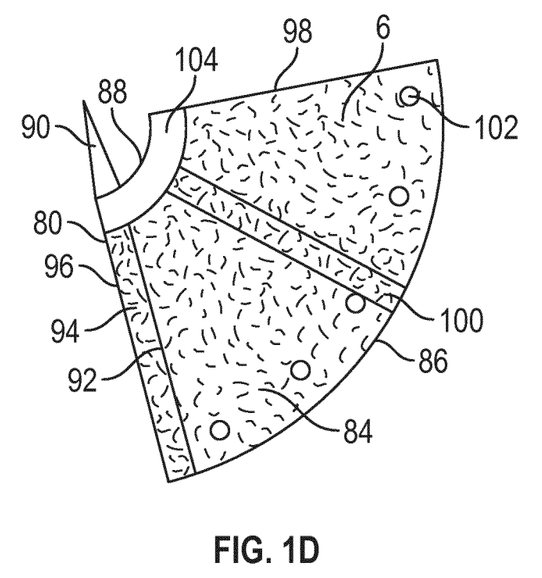
FIG. 1D is a top view of an embodiment of the outer element supplied as a flat sheet to be folded into the final shape as used in the trap in FIG. 1A.

The trap 10 is preferably supplied in an unassembled state. Accordingly FIG. 1D is a top view of an embodiment of the outer element or cone 80 supplied as a flat sheet to be folded into the final shape as used in the trap 10 in FIG. 1A. In addition to the features of the outer cone 80 shown in FIGS. 1A-1C the outer cone 80 in unassembled state may comprise a border 92 partitioning off an adhesive area 94 between the border 92 and the first edge 96 of the inner surface 84. The outer cone 80 is then assembled by folding/bending so that the second edge 98 is lined up with the border 92 where the adhesive area 94 contacts the outer surface 82 so as to form a cone shape. A reinforcement patch 100 may as shown in FIG. 1D be adhered to the outer surface 82 of the outer cone 80 to offset the increased bending resistance caused by the double layer material in the region of the adhesive area 94 to thereby ensure a more uniform conical shape of the outer cone 80, this being advantageous in creating an approximately constant distance δ around the circumference of the inner cone 20 (at each fixed vertical distance from the first base 22 of the inner cone 20). Alternatively, or additionally, spacing elements in the form of a number of dots or protrusions, one of which is designated the reference numeral 102, shown also in FIG. 1B, may be arranged on the inner surface 84 along the base 86 of the outer cone 80 to make point contact with the outer surface 24 of the inner cone 20 to thereby secure the distance δ.

Preferably, in order to allow the outer cone 80 to easily be lifted of the inner cone 20 so that the inner surface 84 can be inspected in search of any caught bed bugs $2_2$ or other crawling insects, a contact area 104 closest to the top end 88 of the outer cone 80 is devoid of the adhesive 6 which otherwise covers the inner surface 84 of the outer cone 80 including the adhesive region 6, the adhesive of which may be the same as, or different from, the adhesive 6 used to catch the bed bugs.

Figure 1E:
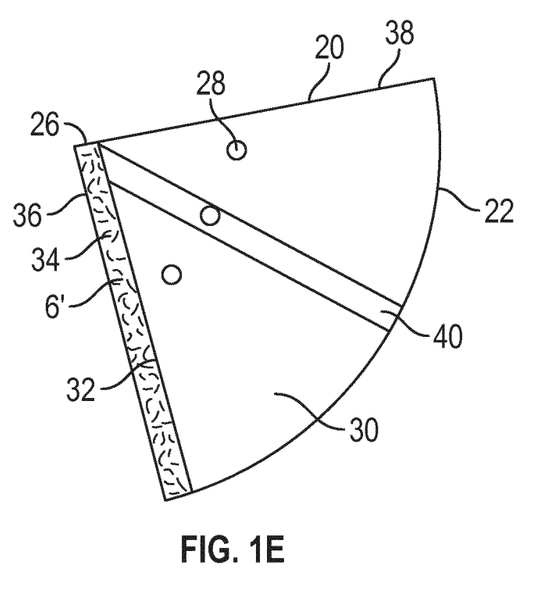
FIG. 1E is a top view of an embodiment of the inner element supplied as a flat sheet to be folded into the final shape as used in the trap in FIG. 1A.

Likewise the inner element or cone 20 may be supplied in an unassembled form as a flat sheet to be folded into the final shape as used in the trap in FIG. 1A. In a similar fashion, on the inner surface 30 of the inner cone 20 a border 32 defines an adhesive area 34 together with a first edge 36 which may be adhered to the outer or inner surface 24 or 30 with the second edge 38 of the inner cone 20 arranged along the border 32. A reinforcement patch 40 may, similarly to reinforcement patch 100, be adhered to the inner surface 30 of the inner cone 20 to offset the increased bending resistance caused by the double layer material in the region 34 to thereby ensure a more uniform conical shape of the inner cone 20.

Each of the inner and outer cones 20 and 80 supplied as shown in FIGS. 1D and 1E may be provided with release sheet (not shown) temporarily adhered to the respective adhesive areas 94 and 34, and for the outer cone 80 also covering all of the inner surface 84, to prevent inadvertent adhering of the respective cones. Accordingly several outer cones 80 and inner cones 20 may be provided stacked on top of each other in a flat package.

Figure 1F:
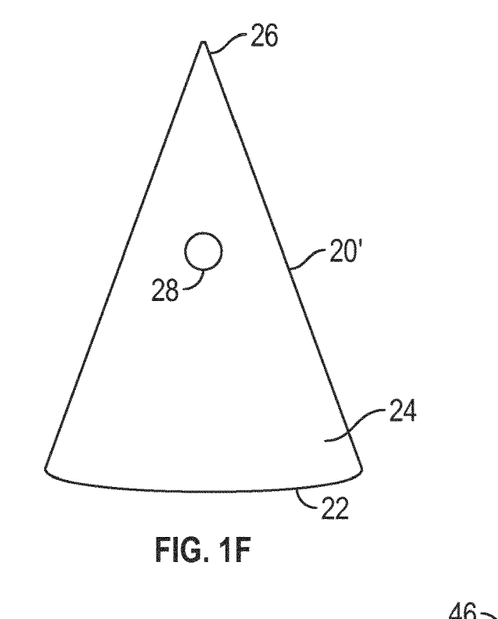
FIG. 1F is a side view of an embodiment of the inner element being a rigid hollow plastic element.

Generally, in use, the outer cone 80 will need to be periodically removed for inspection of the inner surface 84 in search of bed bugs, and also optionally replaced, whereas the inner cone 20 generally will be used for a longer time. Accordingly the inner cone may be fashioned as in FIG. 1F, i.e. as a rigid hollow plastic cone 20', although typically the inner cone 20 will be made from paper or cardboard.

Figure 2A:
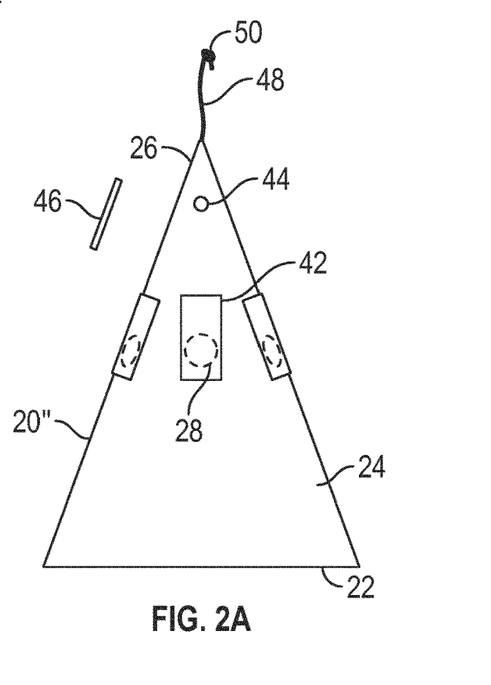
FIG. 2A is a side view of an embodiment of the inner element being a rigid hollow plastic element with a plurality of holes for providing access to lure in a plurality of lure compartments in the inner element.

The trap 10 is preferably used with a scented lure. FIG. 2A is a side view of an embodiment 20" of the inner cone being a rigid hollow plastic element with a plurality of holes 28 for providing access to lure in a plurality of lure compartments in the inner element, the holes being covered by peelable seals 42 allowing one or more holes 28 to be uncovered so as for example provide different scents, or providing a fresh lure when needed, which will be described in more detail in relation with FIG. 2B. The inner cone 20" further includes as optional features a through-going hole 44 to be pierced by a retaining rod or pin 46. This allows the removal of an outer cone 80, once placed on the inner cone 20", to be prevented due to the interference of the ends of the retaining rod or pin 46 with the top end 88 of the outer cone 80 until the retaining rod or pin has been removed from the through going hole 44. This allows the outer cone 80 to be removable yet prevents inadvertent removal. Optionally a string 48 with knot 50 may be attached to the top end 26 of the inner cone 20", to allow the trap 10 to easily be lifted and handled.

Figure 2B:
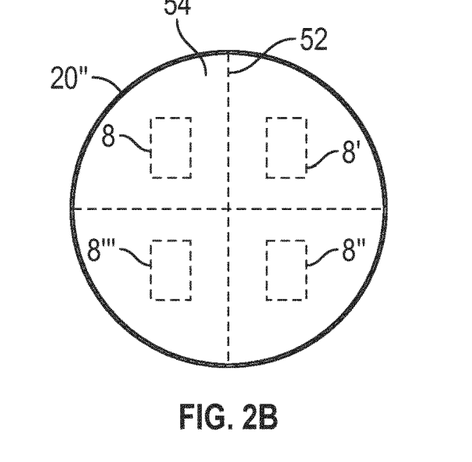
FIG. 2B is a cross sectional view of the embodiment of the inner element shown in FIG. 2A.

Now turning to FIG. 2B which is a cross sectional view of the embodiment of the inner cone 20" shown in FIG. 2A, it can be seen that the interior of the inner cone 20" is divided by partitioning walls 52 into several, in this case four, lure compartments 54, each compartment holding a piece of scent lure 8, 8',8",8"' which preferably are of slightly different composition so as to appeal to different types of bed bugs, thus allowing the trap 10 to be adapted to catching specific bed bug types by peeling of the corresponding seal 42.

Figure 2C:
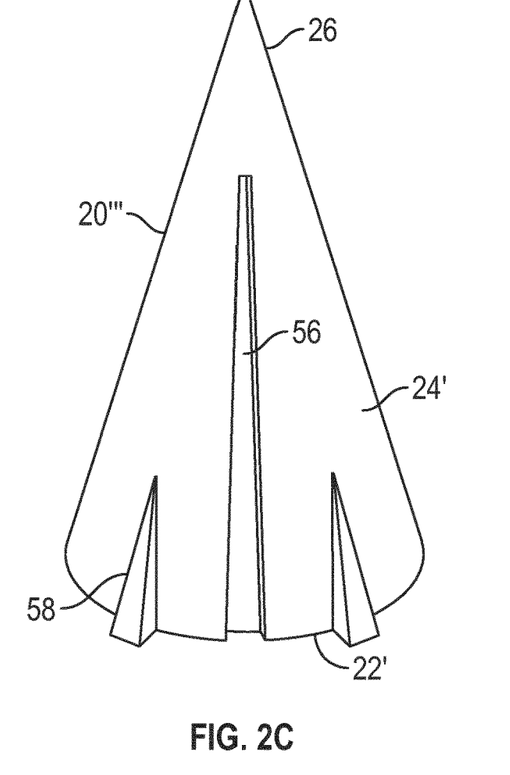
FIG. 2C is a perspective view of an embodiment of the inner element being a solid piece moulded from a lure material.
Figure 2D:
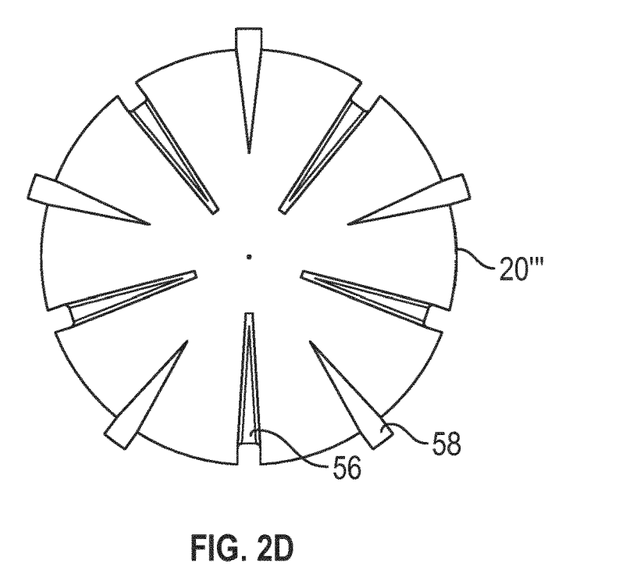
FIG. 2D is a top view of the embodiment of the inner element shown in FIG. 2C.

Alternatively, the inner cone may be fashioned as a solid piece 20"" moulded from a lure material as shown in FIGS. 2C and 2D. This is possible for lures which are formulated to be relatively solid at room temperature. Moulding the inner cone 20"" allows for simple inclusion of further features such as longitudinal grooves 56 for further enticing the bed bugs to crawl over the outer surface 24' from the base 22' towards the top end 26, or circumferentially spaced moulded spacing elements 58 to ensure a proper distance δ to the inner surface 84 of the outer cone 80.

Figures 3A, 3B, 3C:
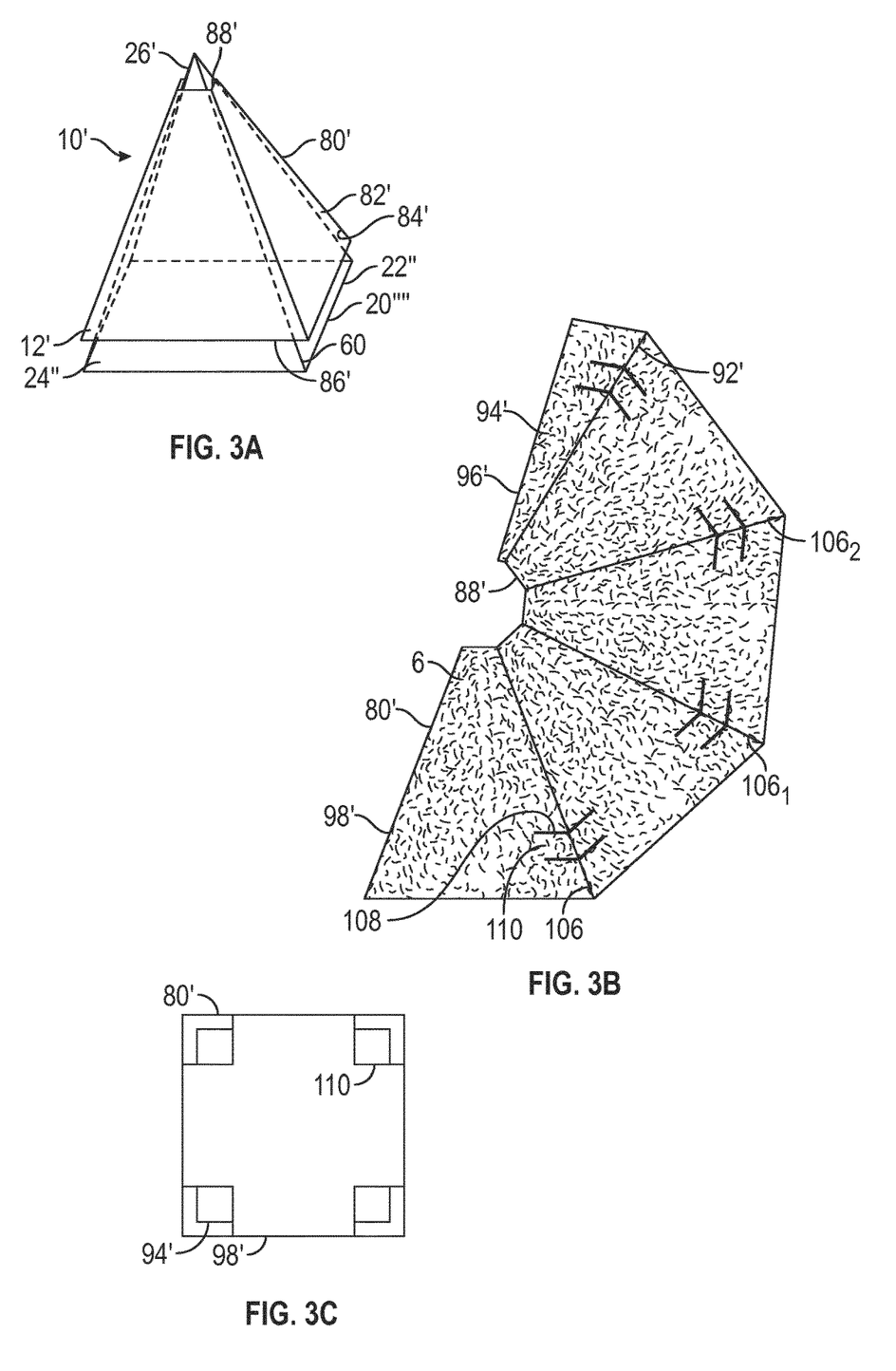
FIG. 3A is a perspective view of a second embodiment of the trap for bed bugs according to the first aspect of the present invention, this embodiment being characterized by having pyramidical inner and outer elements.
FIG. 3B is a top view of an embodiment of the outer element supplied as a flat sheet to be folded into the final shape as used in the trap in FIG. 3A
FIG. 3C is a bottom view of the embodiment of the outer element shown in FIG. 3B when folded into the final shape as used in the trap in FIG. 3A.

FIG. 3A is a perspective view of a second embodiment 10' of the trap for bed bugs according to the first aspect of the present invention, this embodiment being characterized by having pyramidal inner 20"" and outer 80' elements instead of the inner and outer cones 20 and 80. The inner element 20"" similarly to the inner element shown before comprises a first base 22" and an outer surface 24" as well as a first top 26'. The outer element 80' also comprises an outer surface 82', an inner surface 84', a second base 86' and a second top 88'. Similarly to the trap shown in the preceding figs the angles of the inner and outer pyramidal elements differ so that a tapering space 12' is defined there between, in which space the bed bugs 2 enter and eventually are trapped by the adhesive 6 on the inner surface of the outer pyramidal element 80'.

The trap 10' may be advantageous in that it is easier to obtain from the non-folded flat state as shown in FIG. 3B which is a top view of the outer pyramidal element 80' supplied as a flat sheet to be folded into the final shape as used in the trap in FIG. 3A. Thus the outer pyramidal element 80' is divided into four segments by three fold lines 106, $106_1$ and $106_2$, an additional border and folding line 92' defining, similar to what is shown in FIG. 1D, an adhesive area 94' together with the first edge 96', allowing the outer pyramidal element 80' to be assembled by folding along the fold lines and attaching the adhesive area 94' to the inner or outer surface 84' or 82' with the second edge 98' arranged along the border 92' so as to form a four-sided pyramid. Optional parallel cuts 108 (not shown in FIG. 3A) across the folding lines 106, $106_1$, $106_2$ and across the additional border and folding line 92' define invertible areas 110 which may be inverted, once the outer pyramidal element 80' has been assembled, thus forming spacing elements extending towards the center axis of the outer pyramidal element 80', as seen in FIG. 3C which is a bottom view of the outer element shown in FIG. 3B when folded into the final shape as used in the trap in FIG. 3A.

Figure 3D:
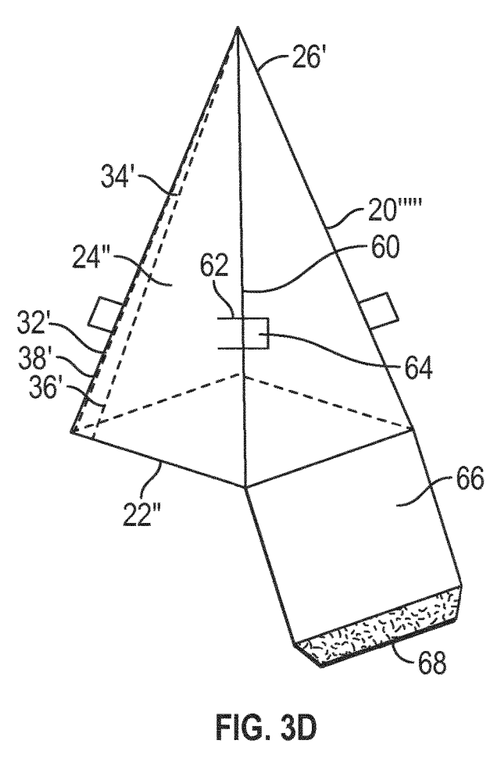
FIG. 3D is a top view of an embodiment of the inner element supplied as a folded structure to be expanded into the final shape as used in the trap in FIG. 3A
Figure 3E:
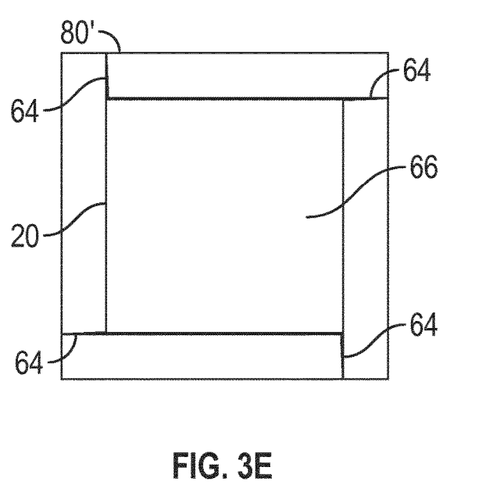
FIG. 3E is a bottom view of the embodiment of the inner element shown in FIG. 3D when expanded into the final shape as used in the trap in FIG. 3A.

FIG. 3D is a top view of an embodiment of the inner element 20'''' supplied as a folded structure to be expanded into the final shape as used in the trap in FIG. 3A. The inner element 20'''' is supplied as a collapsed pyramidal shape which has been collapsed so that two opposite fold lines or edges 60 are adjacent each other. The inner element may for example have been assembled similarly to as described in relation to FIG. 1E, i.e. by adhering the edge 38' along the border 32' defining with the edge 36 the adhesive area 34'. Cutouts 62 define spacing elements 64 which project out from the outer surface 24" when the inner pyramidal element 20'''' has been assembled, as shown in FIG. 3E which is a bottom view of the inner pyramidal element shown in FIG. 3D when expanded into the final shape as used in the trap in FIG. 3A, to thereby ensure a proper distance δ between the inner and outer pyramidal elements 20'''' and 80". The inner pyramidal element also as an optional bottom 66 with adhesive flap 68 which can be used to seal the hollow interior of the assembled inner pyramidal element 20'''' once for example a lure has been positioned within it. In this case the inner element 20'''' may be provided with an aperture 28 as shown in FIGS. 1B, 1F, 2A and 2B.

Figure 4A:
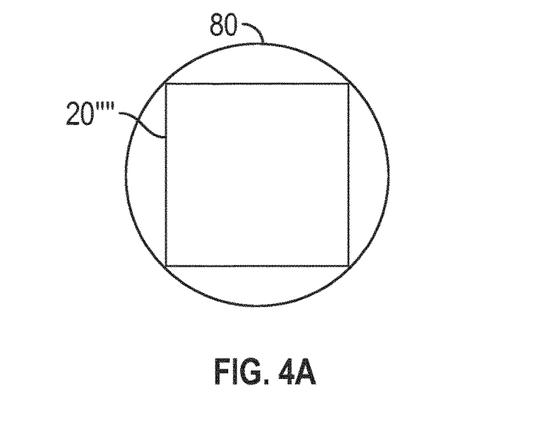
FIG. 4A is a bottom view of an embodiment of the trap for bed bugs according to the first aspect of the present invention having an inner element having a rectangular base and an outer element having a circular base.
Figure 4B:
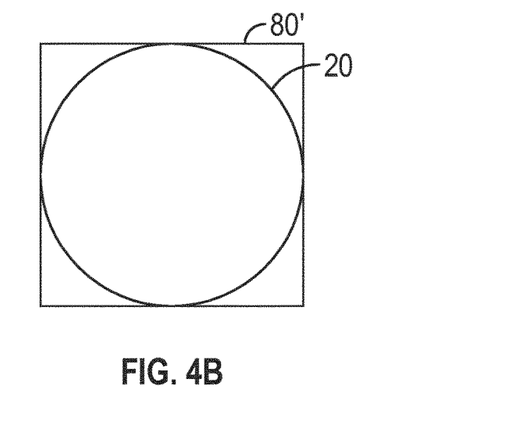
FIG. 4B is a bottom view of an embodiment of the trap for bed bugs according to the first aspect of the present invention having an inner element having a circular base and an outer element having a rectangular base.

Other combinations of inner and outer elements are also possible for providing the tapering space 12 as shown in FIG. 4A which is a bottom view of an embodiment of the trap for bed bugs according to the first aspect of the present invention having the inner element 20'''' with a rectangular or square base and an outer element 80 having a circular base, and FIG. 4B which is a bottom view of an embodiment of the trap for bed bugs according to the first aspect of the present invention having the opposite arrangement, i.e. an inner element 20 having a circular base and an outer element 80' having a rectangular or square base.

EXAMPLE

Materials and Methods

Four prototype traps, two being designated trap A, and two being designated trap B, according to embodiments of the first aspect of the present invention were fabricated and evaluated.

Trap A consisted of an inner and an outer paper cone, each being produced by bending a planar sheet of paper into a conical shape. A piece of adhesive tape was applied to one edge of the thus formed cone to maintain the bent configuration. The cone angles of the inner and outer cones were different, where the outer element was represented by the cone having the larger cone angle, and the inner element being represented by the cone having the smaller cone angle. The inner cone had a height of about 6 cm and a width at the first base of about 5 cm and the outer cone had a height of about 4 cm, resulting in a distance D see FIG. 1B, of 0.7 cm, noting that a top opening of the outer cone allowed the top of the inner cone to extend about 2 cm through it. The width of the outer cone at the second base was about 5.6 cm resulting in a distance δ at the base opening of the outer cone/element of about 0.4 cm. Before folding the planar sheet for the outer cone a layer of double sided adhesive tape (TESA carpet tape) was affixed to the side of the sheet becoming the inner surface of the outer cone when bent into the conical shape.

Trap B had the same construction as A, however the TESA carpet tape was replaced by a double sided adhesive tape of the make Stokvis.

Tests on the traps were performed as follows. Two bed bug lures (comprising (E)-2-hexenal, (E)-2-octenal, 2-hexanone (E)-2-hexenoic acid and 2-octenoic acid) were placed spaced apart from each other in a test arena consisting of a circular tray having a diameter of 520 mm.

In a first test round each of the two A traps was placed over a corresponding one of the lures and 10 bed bugs (adult, male, fed state) were released in the middle of the test arena and allowed to move freely during 30 minutes.

In a second test round the test was repeated with the B traps placed over the lures.

Results

The bed bugs were not alarmed by the traps; rather the bed bugs quickly began to investigate them. After the first test round (30 minutes) a total of 5 bed bugs were found trapped, by the adhesive having contacted their dorsal sides, in the two A traps.

In the second test round after the same amount of time a total of 2 bed bugs were found trapped, by the adhesive having contacted their dorsal sides, in the two B traps.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A trap (10) for bed bugs (2) comprising:
an inner element (20) having an outer surface (24) delimited by a first base (22) and a first top (26), and
an outer element (80) being hollow and having a second base (86) and a second top (88) delimiting an inner surface (84),
the outer element being positioned around the inner element with the second top adjacent to the first top and the second base adjacent to the first base, a tapering space (12) being defined between the outer surface of the inner element and the inner surface of the outer element, the tapering space tapering towards the first top, wherein the distance between the outer surface of the inner element (20) and the inner surface of the outer element (80) decreases towards the first top (26), and wherein the distance between the outer surface of the inner element (20) and the inner surface of the outer element (80) is zero at the first top (26), the tapering space being accessible to bed bugs crawling on the outer surface of the inner element through a base opening defined between the outer surface of the inner element and the second base, wherein an adhesive (6) is provided on at least part of the inner surface (84) of the outer element for adhering to a dorsal side (4) of bed bugs crawling on the outer surface of the inner element.

2. The trap (10) according to claim 1, wherein the inner element (20) is hollow and comprises a lure compartment (54) therein, and wherein a hole (28) for establishing fluid communication between the lure compartment and the tapering space (12) is provided in the outer surface (24).

3. The trap (10) according to claim 2, wherein the inner element (20) comprises a plurality of individual lure compartments (54), and wherein the outer surface (24) of the inner element comprises a plurality of holes (28) for establishing fluid communication between a corresponding lure compartment and the tapering space (12).

4. The trap (10) according to claim 2, wherein at least one of the plurality of holes (28) is covered by a puncturable seal or a tearable cover (42).

5. The trap (10) according to claim 1, wherein the inner element (20) is made from paper or plastic.

6. The trap according to claim 1, wherein the inner element is made out of a lure material.

7. The trap (10) according to claim 1, wherein at least one groove (56) or ridge (58), extending at least partly from the first base (22) towards the first top (26), is provided in or on the outer surface (24) of the inner element (20).

8. The trap (10) according to claim 1, wherein the inner surface (84) of the outer element (80), and/or the outer surface (24) of the inner element (20) is provided with at least one spacing element (58, 102) for ensuring a minimum distance (δ) between the outer surface of the inner element and the inner surface of the outer element at the second base.

9. The (10) trap according to claim 1, wherein the outer element (80) has a top opening (88) at the second top (88), the top opening being configured for receiving the first top (26) so that at least part of the first top extends through the top opening.

10. The trap (10) according to claim 1, wherein the first base (22) has a larger cross sectional area than the first top (26), and wherein the second base (86) has a larger cross sectional area than the second top (88).

11. The trap (10) according to claim 1, wherein the inner element (20) has a conical, frustoconical, pyramidal or truncated pyramidal shape, and the outer element (80) has a conical, frustoconical, pyramidal or truncated pyramidal shape.

12. The trap (10) according to claim 1, wherein an area (104) of the inner surface (84) of the outer element (80) adjacent the second top (88) is devoid of adhesive.

13. The trap (10) according to claim 1, wherein the outer element (80) is detachable from the inner element (20).

14. The trap (10) according to claim 1, wherein at least one of the inner and outer elements (20, 80) is made from a folded or bent planar sheet, the planar sheet preferably being provided with a fastener (34) for fastening one part (38) of the planar sheet to another part (32) of the planar sheet to maintain the planar sheet in a folded or bent configuration.

15. The trap (10) according to claim 1, wherein an adhesive (6) is provided on all of the inner surface (84) of the outer element for adhering to the dorsal side (4) of a bed bug crawling on the outer surface of the inner element.

16. The trap (10) according to claim 1, wherein the outer surface of the inner element (20) contacts the inner surface of the outer element (80) at the first top (26).

17. A method of detecting and/or trapping bed bugs (2), comprising the steps of:
   i. providing a trap (10) according to claim 1, and
   ii. positioning the trap with the first base towards a planar surface (1) in a locale where bed bugs are present or suspected of being present.

\* \* \* \* \*